March 19, 1946.  C. F. WALLACE  2,396,934
DETECTION OF THE CHEMICAL CONDITION OF MATERIALS
Filed Aug. 3, 1940  3 Sheets-Sheet 1
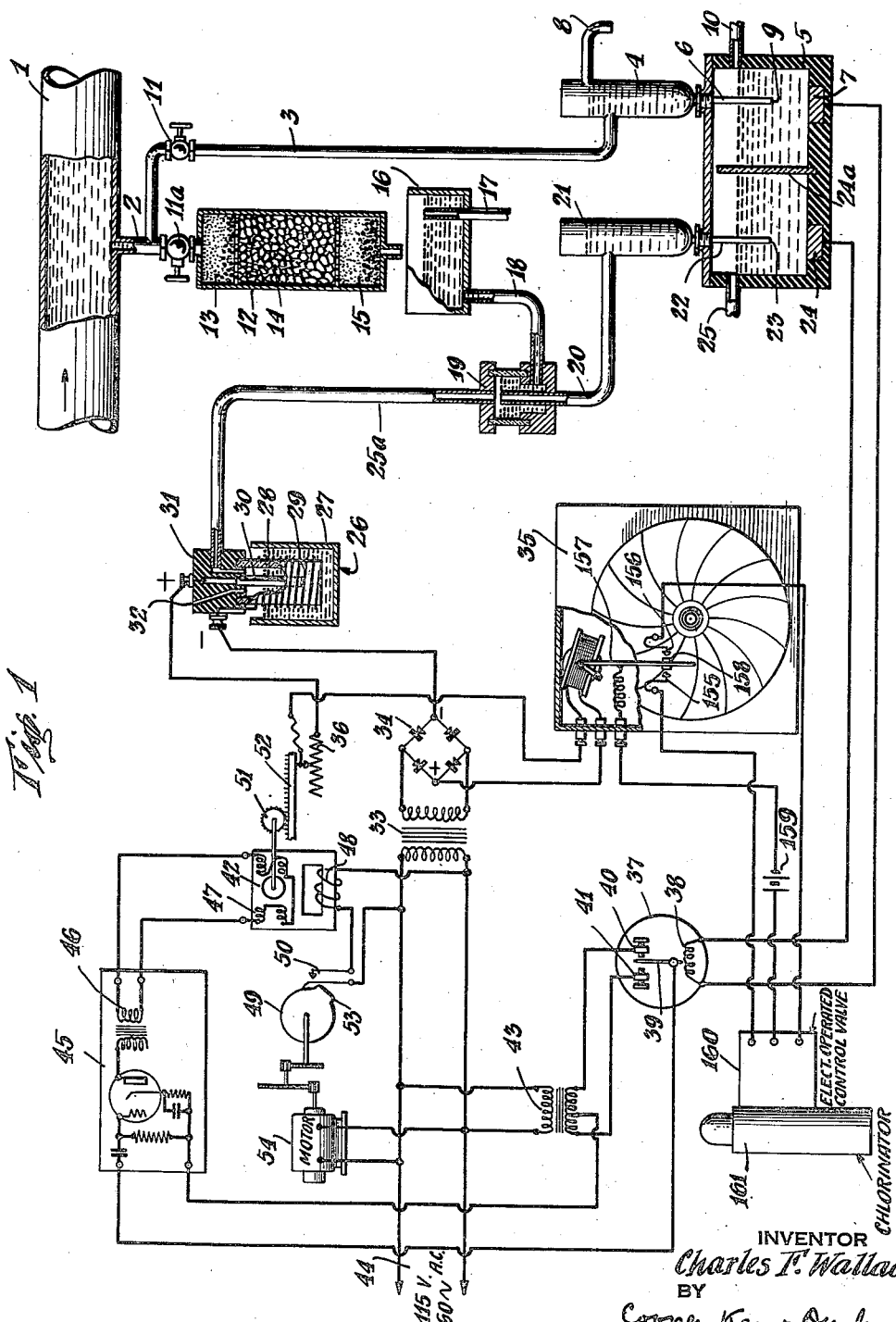
INVENTOR
*Charles F. Wallace*
BY
*Cooper, Kerr & Dunham*
ATTORNEYS

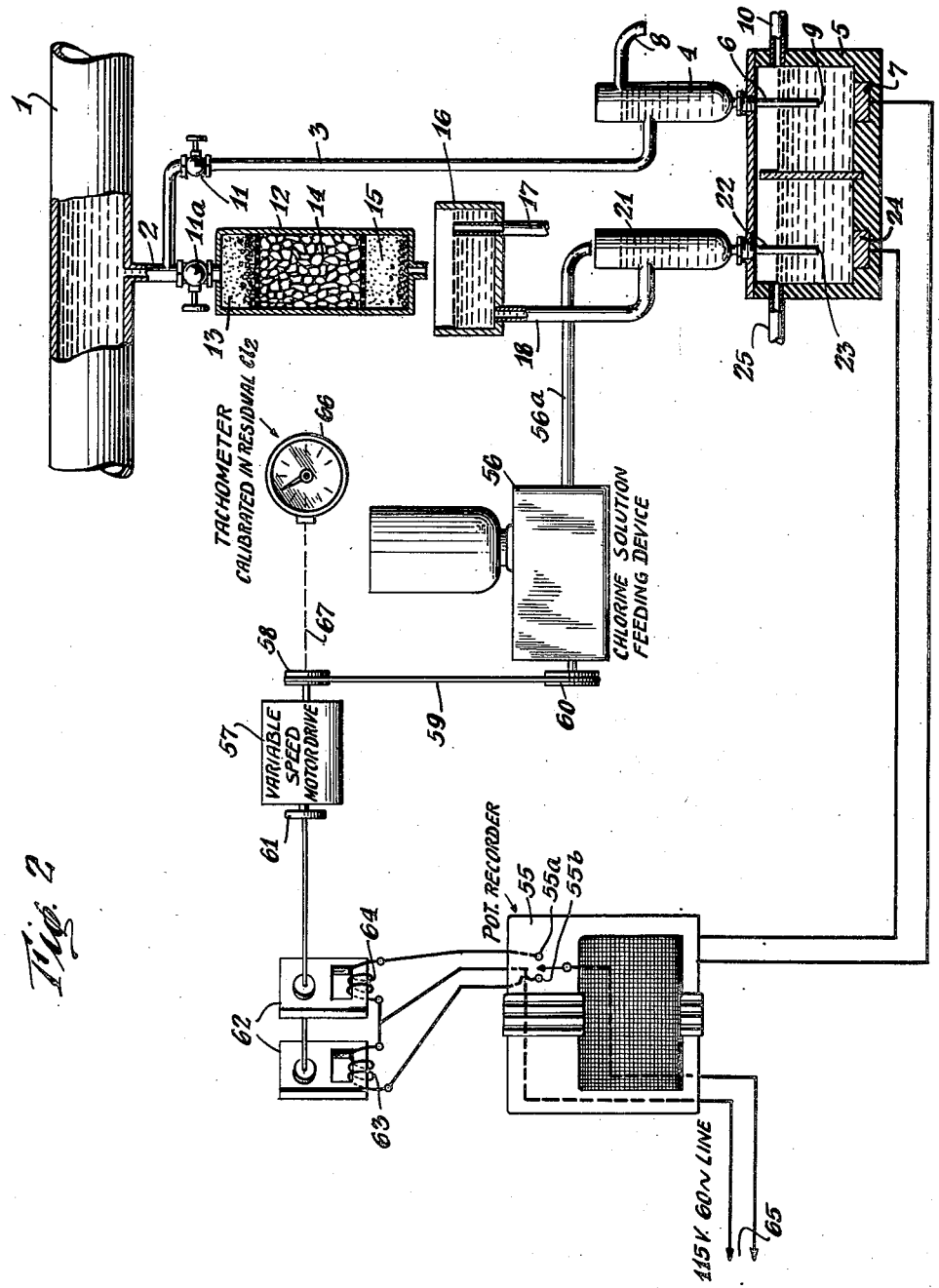

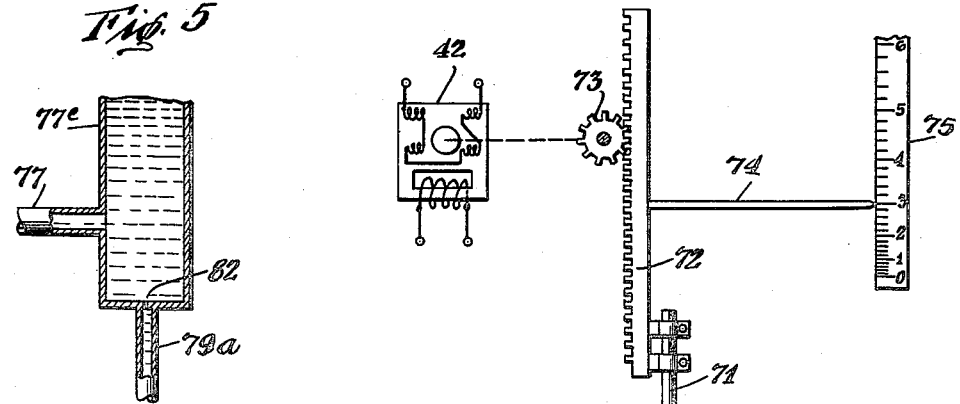
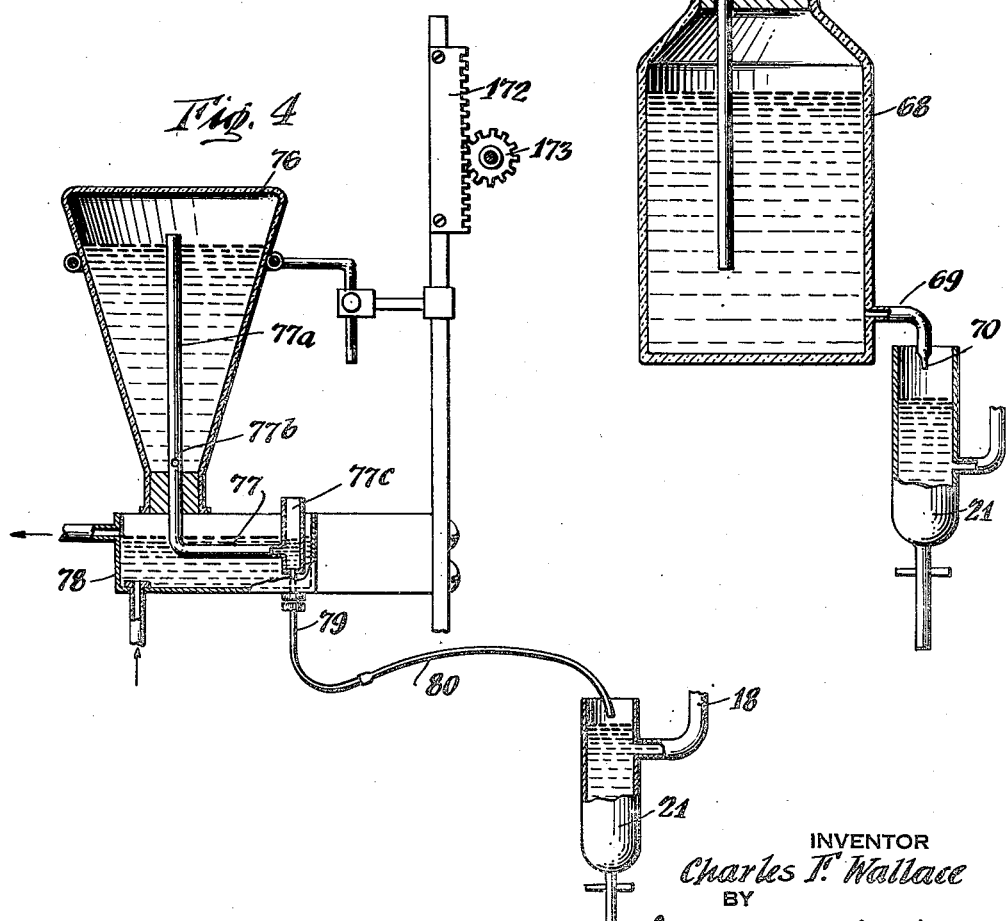

Patented Mar. 19, 1946

2,396,934

UNITED STATES PATENT OFFICE 2,396,934

DETECTION OF THE CHEMICAL CONDITION OF MATERIALS

Charles F. Wallace, Westfield, N. J., assignor to Wallace & Tiernan Products, Inc., Belleville, N. J., a corporation of New Jersey Application August 3, 1940, Serial No. 350,712

19 Claims. (Cl. 210—28)

This invention relates to the detection of the chemical condition of materials, and more particularly to procedure and apparatus for determining the presence and quantity of a substance or other chemical characteristic in a flowing liquid or a large body of liquid; an example of such determination being for the measurement of the amount of a given substance introduced by or remaining from a particular treatment of the liquid. Thus, an important embodiment of the invention is in detecting the chlorine concentration in water, sewage, or other liquids, which may have been treated with chlorine.

Certain principal objects of the invention are to provide improved procedure and apparatus of the character stated, wherein the liquid undergoing test need only be sampled at one point; wherein the effect of other chemicals or materials in the liquid may be balanced out to restrict the reading substantially to the effect alone of the substance under measurement; wherein the indications or measurements may have a substantially linear relationship to the concentration of the given substance, e. g., chlorine, in the sampled liquid; and wherein the detection of the substance, such as chlorine, may be effected through electrolytic instrumentalities in such a way, if desired, that relatively little or no current is drawn except at times of extreme unbalance.

Further objects include the provision of methods and means to afford more accurate, efficient and economical operation in the detection, indication or recording of the concentration of a substance in a fluid, or for operating control instrumentalities in accordance with such concentration; additional objects including such as are hereinafter stated or as will be apparent from the following description and appended drawings.

To these and other ends, important features of the invention for the determination of a given substance, say chlorine in water, sewage or other liquid, may include sampling the liquid at a preferably constant rate, dividing the sampling into two portions, subjecting one of the portions to a treatment adapted to neutralize or remove the substance, thereafter subjecting the so treated portion to fresh application of the substance at a known or detectable rate, and then conducting both portions of the sampling to apparatus for comparing their respective concentrations of the substance. Although there are various ways for effecting such comparison (for example, in the case of chlorine, by adding ortho-tolidin solution to the treated and untreated samples and photoelectrically detecting the color which is representative of chlorine content in each portion), particularly efficient results are obtainable with chemically sensitive electrolytic cells.

Further provisions are preferably included whereby the comparing step, carried out with electrolytic cell apparatus or other suitable indicator, is automatically caused to control the rate of substance addition to that portion which has been subjected to the treatment for removal of substance. Thus upon adjustment, for example, of the rate of substance addition to a point of balance, where the comparison step yields a null result (i. e., an indication that the treated and untreated portions are alike), such rate of substance addition to the first-mentioned portion of the sampling may be read, recorded or otherwise utilized to afford an accurate representation of substance concentration in the original liquid. In this way the desired determination is obtained independently or substantially independently of the content of other materials in the liquid, and also independently of non-linear or other undesirable characteristics of the substance-sensitive indicator, as well as without deleterious current drain from the indicator (as where the latter is an electrolytic cell of a type that is affected by current drain); and at the same time, the advantages of testing by comparison are fully realized with a sampling of the liquid at only a single point.

By way of example, certain presently preferred embodiments of the invention are hereinafter described and illustrated in the drawings, wherein:

Fig. 1 is a view, chiefly diagrammatic, of one system embodying the invention;

Fig. 2 is a similar view of a somewhat modified embodiment;

Fig. 3 is a view, partly in vertical section and partly diagrammatic, of a chemical feeding device, adapted to be used or substituted in the apparatus of Figs. 1 and 2;

Fig. 4 illustrates a modified form of the apparatus shown in Fig. 3; and

Fig. 5 is a detail view illustrating a modification of a part of the apparatus of Fig. 4.

While the invention is susceptible of use in other combinations and environments, it is very advantageously adapted for systems to detect change in the composition of a liquid. Accordingly, the systems shown in the drawings will be described as applied to the detection and determination, for example, of the chlorine concentration of water, sewage or other liquid which may be contained in or flowing through or from a system involving treatment by the application of chlorine or chlorine-liberating material.

Referring to Fig. 1, the liquid to be tested may, for instance, consist of water flowing through a conduit 1 from some place where it has been treated to introduce chlorine, say by operation of a chlorinator. Through a pipe 2 a sample of the chlorinated water is withdrawn and divided into two portions, one of which flows through a further conduit 3 to a constant level chamber 4, from which it is fed to one side of an indicating or comparing device comprising, for example, the chlorine sensitive cell 5. The liquid thus flows into the cell through the restricted section 6 of the chamber 4 and thereby impinges directly against one electrode 7 of the cell. The chamber 4 includes an overflow outlet 8 whereby a constant head or pressure is maintained at the outlet orifice 9 of the restricted section 6, so as to introduce the liquid at a constant pressure and rate. An overflow pipe 10 in the cell exhausts the liquid to waste therefrom, and maintains a predetermined level. A valve 11 is conveniently provided in the conduit 3 for appropriate adjustment to prevent an excessive amount of liquid being run to waste through the overflow pipe 8.

The other portion of the sampled liquid in the pipe 2 is conducted through a valve 11a, similar in function and purpose to the valve 11, to a de-chlorinating device generally designated 12. Although other apparatus may be employed for treatment of the sampled portion to remove therefrom the substance in question, e. g. chlorine, the de-chlorinator 12 is shown, for purposes of illustration, as a device which is available on the market and known as the "Hydrodarco Purifier" and which is manufactured by the International Filter Company of Chicago, Illinois. The form of such unit which is at present preferred comprises a layer of graded sand 13, a layer of activated carbon 14, and a further layer of graded sand 15, through which the liquid successively passes. By "graded sand," I mean that the upper portion of each of the sand filter sections 13 and 15 is composed of relatively fine sand particles, the intermediate portion of coarser particles and the bottom portion of still coarser particles or fine gravel.

In this filter device 12 the activated carbon effectively removes all traces of chlorine from the water, which then exhausts into a constant level box 16 where it is maintained at a desired head by means of the overflow tube 17. From the box 16 the liquid flows at a constant pressure and rate through a tube 18 to apparatus for the introduction of chlorine—here shown, for example, as including a special form of aspirator 19—and thence through a further tube 20 into a feed chamber 21, having a restricted portion 22 and outlet orifice 23 like elements 6 and 9 of chamber 4, for impingement upon another electrode 24 of the cell 5. As stated, the box 16 provides a constant pressure and velocity of the liquid at the orifice 23, and exhaust from this portion of the cell is carried by an overflow tube 25, which functions like the tube 10 in the other cell portion.

It will be understood that various forms of cells or other concentration sensitive indicators may be utilized to provide the detection and comparison afforded by the apparatus designated 5 in this figure. Thus, although cells of the type disclosed in Patent No. 1,944,803 to Georg Ornstein, or cells of the type disclosed in my copending patent applications, Serial Nos. 290,841 and 290,842, filed August 18, 1939, the latter of which is now Patent No. 2,350,378, issued June 6, 1944, may be employed, and although a detection circuit might thus, for example, be utilized in which the effect depends on depolarization produced by the presence of chlorine and affords a flow of current at all times, I have shown, for purposes of illustration, a cell of a type illustrated in my copending Patent No. 2,289,610, issued July 14, 1942 (wherein certain novel features and combinations in such electrolytic cell apparatus are claimed).

As is more fully disclosed in my Patent No. 2,289,610, the cell 5 may include two liquid electrodes 7, 24, e. g. of mercury, which have their surfaces agitated and maintained in a clean and accurately potential-responsive condition by the impingement of the jets of water from the orifices 9 and 23 respectively. The cell is divided into two portions by a permeable or porous partition 24a, and as will now be understood, it is adapted to provide a difference of potential between the electrodes 24 and 7 upon a difference in chlorine concentration of the liquids in the corresponding cell portions.

The illustrated aspirator device 19 comprises a receptacle for a body of liquid which is fed below its surface by the pipe 18, the outlet from the receptacle being afforded by the tube 20 opening upwardly therein as shown so that as the liquid flows over and down through the top of the tube 20 it entraps and carries away such air or gas as may be delivered through a feed conduit 25a extending up from the top of the device. That is to say, in effect, the aspirator produces a small amount of vacuum or suction in the line 25a so as to draw into and mix with the liquid, the gas (in this instance, chlorine) which it is desired to add.

Although other chlorine generator apparatus may be employed, I have conveniently illustrated a generating cell 26 of the general type described in my Patent No. 1,678,625 issued July 24, 1928, for Apparatus for the therapeutic application of chlorine. While a more complete description of the device may be had by reference to the cited patent, a brief explanation of it is here set forth.

A container 27 which may be of glass or other suitable material is arranged to hold a small quantity of an appropriate electrolyte such as hydrochloric acid. Within the jar 27 is inserted a tubular porous diaphragm 28 inert to the action of chlorine, which has supported on its outer surface an electrode 29 that may be made from a spirally wound silver wire. Inside the tube 28 there is disposed a suitable electrode 30, for example of platinum or a graphite rod, from the surface of which chlorine gas is liberated when electric current flows through the cell and its associated circuit.

A hard rubber block 31 is recessed to contain one end of the electrode 30 and of the porous tube 28 and to mount the positive and negative terminal posts which connect to their respective electrodes. A passage is provided in the block 31 for entrance of the tube 25a and the block also has a duct 32 which permits communication between the interior of the tube 28 and the atmosphere. As fully explained in my cited U. S. Patent No. 1,678,625, the passage of electric current through the cell 26 causes the production of chlorine gas at the positive electrode 30. The amount of gas produced depends upon the current flowing through the cell and bears a substantially uniform and linear relationship to the same.

For operation of the cell 26, alternating current is supplied from a transformer 33 to a rectifier 34, conveniently of the full wave, dry disc type, which is thus adapted to produce at its output terminals a substantially continuous direct current. As shown, the output terminals of the rectifier are connected in series with the cell, a recording instrument 35, and a variable resistance or slide wire 36. Although other types of indicating or recording instruments may be employed, preferably an instrument adapted to afford a substantially linear response to variations of current flow, it is presently preferred to employ a recording meter of the galvanometer type disclosed in my Patent No. 2,350,378, cited hereinabove; such instruments being sensitive, efficient and especially adapted for measurements of the character here contemplated. It will now be appreciated that the current through the cell 26 and hence its rate of chlorine evolution, may be readily controlled by adjustment of the slide wire 36, say from a position for a predetermined low or even zero current, to a convenient maximum current (i. e., low resistance) position.

For control by the cell 5, a sensitive galvanometer type relay 37 has its movable coil 38 connected to the electrodes 7 and 24. The beam or contact arm 39 of the relay is adapted for deflection to the left or right, depending upon the direction of current in the coil 38, into contact with one or the other of the contacts 41, 40; and through instrumentalities presently to be described, closure of the circuit through one or the other of these contacts is adapted to initiate operation of a servo-motor 42, for corresponding adjustment, in one direction or the other, of the tap position on the slide wire 36. Thus, if the potential generated between the liquids in the cell 5 and the electrodes 7 and 24 upon which they respectively impinge, are equal in value, no current will flow through the coil 38 and its beam 39 will remain in center position, out of engagement with either of the contacts 41 and 40. On the other hand, if a voltage difference exists between the electrodes of the cell, the beam will be deflected to one side or the other, and operation of the servo-motor will result, for adjustment of the position of the tap on the slide wire 36.

Although other systems may be employed for electrical control of the variable resistance 36 by the galvanometer relay, a notably advantageous system is shown which in its fundamental features embodies the motor control apparatus (including an amplifier and a shaded pole servo-motor having wound shading coils energizable by the amplifier) of the type disclosed in the patent to John R. MacKay, No. 2,234,349, granted March 11, 1941, and also in British Patent No. 493,457, of Wallace & Tiernan Products Inc., for Motor control apparatus, dated December 29, 1938.

In the illustrated system, a supply transformer 43, having its primary energized from the same A. C. line 44 as for the transformer 33, is provided with a center tapped secondary. The end terminals of the secondary are connected to the respective contacts 40, 41, as shown, while the movable contact or beam of the galvanometer and the center tap of the transformer secondary, are connected to the input terminals of an amplifier 45, say, an electron tube amplifier equivalent to the final stage of the type of amplifier illustrated in the cited MacKay patent or British patent. The amplifier has an output winding 46 which is connected in series with the opposed sets of wound shading coils 47 of the servo-motor 42, likewise as disclosed in the cited patent and British patent. The field winding 48 of the motor is connected for energization from the A. C. line 44, preferably through the contacts 50 of an intermediate camming device 49 hereinafter described. It will now be understood that the arrangement of the two pairs of shading coils 47 of the servo-motor is conveniently such that they oppose each other in electrical effect and prevent rotation of the motor when there is no voltage at the amplifier input and consequently no E. M. F. developed in the winding 46.

Thus, when the galvanometer beam 39 is in its center or null position (although contacts 50 are assumed to be closed), the motor will not turn and there will be no change of the adjustment of the position of the tap on the slide wire 36. But if the beam 39 is deflected against the stationary contact 41, a voltage will be impressed (from one-half of the secondary of transformer 43) upon the input of the amplifier such as to produce in the output of the latter an E. M. F. having a predetermined definite phase relation to the voltage on the field coil of the motor 48. Consequently, the effect of one set of shading coils will be assisted and that of the other set will be opposed and overcome, so that the motor runs in one direction. Likewise if the beam is deflected against the contact 40 the impressed voltage on the amplifier (derived from the other half of the secondary of transformer 43) will be such that the output voltage is in effect 180° opposite in phase to the voltage produced under the conditions previously described; and the motor will be driven in the opposite direction.

To illustrate the operation of the system, let it be assumed that the liquid flowing in the pipe 1 has been treated to produce in it a residual of free chlorine. The presence of chlorine in the liquid will cause a voltage to be developed at its junction with the electrode 7 of the cell 5. If it is further assumed that the tap on the resistance 36 is in such position that no effective current is flowing through the chlorine generating cell 26, the portion of the sampling which reaches the feed chamber 21 and electrode 24 is and remains completely de-chlorinated (by the de-chlorinating device 12) so that no potential due to chlorine is developed at the junction of that liquid with the electrode 24. The resulting difference of potential between the electrodes 24 and 7 creates a flow of current through the coil 38 of the galvanometer relay, so as to deflect its beam against, say, the stationary contact 41. Thereupon by virtue of the instrumentalities described hereinabove, the motor 42 is caused to rotate in a direction to decrease the resistance of the slide wire 36, it being conveniently assumed that the connection of the motor to the pinion 51 and rack 52 or other suitable means for slide wire adjustment is such that the motor operation resulting from closure of contact 41 will move the sliding contact in such direction.

Current through the circuit of the cell 26 being thus established or increased above an ineffective value, the motor 42 will continue to rotate and continue to adjust the resistance until the current flow in that circuit causes generation of sufficient chlorine gas to bring the chlorine concentration of the liquid in vessel 21 to a point where the potential developed at electrode 24 is equal to that developed at the electrode 7. When that condition is reached, there will be no difference of potential across the galvanometer coil 38 and its beam will return to the center position, interrupting rotation of the motor 42.

It will now be apparent that since, in this condition of equality or balance, the chlorine concentration being developed in the liquid in chamber 21 is now equal to that in the main body of liquid in pipe 1 (which is directly conducted to the electrode 7), the reading of the recording galvanometer 35 may be readily and accurately correlated to the chlorine concentration of the material being sampled from conduit 1 and thereby indicate the same. By the same token, if the chlorine concentration in the main body of liquid decreases, a difference of potential, in the opposite direction, will be established between the electrodes 7 and 24, whereupon the motor 42 will be operated to reduce the current in the circuit of the generating cell 26, and the recorder 35 will yield a correspondingly lower reading. And in similar fashion if the chlorine concentration in the sampled material rises, operation of the system in the other direction wll result (as previously described) and the recorder 35 will show a proportionately higher reading.

In many cases, either upon initial operation of the system or upon subsequent change in the condition of the sampled liquid, there may be some delay before equilibrium is established between the solutions laving the electrodes 7 and 24. To prevent or minimize hunting under such circumstances, an intermittent contact device may be included comprising the cam 49 having a high spot or projection 53 for periodically closing the contacts 50 in the field circuit of the motor 42. The cam 49 may be rotated at a preferably constant rate by suitable means, such as a motor 54 energized from the A. C. line 44. It will now be understood by those skilled in the art that the control of the slide wire 36 can only take place during the intermittent periods when contacts 50 are closed—preferably short periods spaced by relatively longer intervals—and that the peripheral length of the cam projection 53 or the speed of the motor 54 or other suitable control may be so designed or adjusted as to provide both a desirable rapidity of response and a reduction of hunting tendencies to a convenient minimum.

Fig. 1 also shows further apparatus whereby automatic control may be had, for instance, to maintain the chlorine concentration in the liquid in pipe 1 at a desired value. Although any of a wide variety of reagent feed control devices may be controlled by systems of the type shown, a simple arrangement includes "high-low" contacts 155, 156 spring mounted on either side of the arm 157 of the galvanometer 35, in such position that when the arm departs above or below a position or permissible range of desirable chlorine content in the liquid of pipe 1, a central contacting element 158 engages one or the other of the contacts 155, 156.

As shown, the latter, and the central contact 158 through a current source 159, are connected to the terminals of an electrically operated control valve 160 for a chlorinator 161; the valve 160 being conveniently such, as will now be understood by those skilled in the art, that establishment of the circuit through one or another of the high-low contacts respectively moves the valve to a more closed or more open position. It will be understood that the chlorinator 161 is adapted to feed chlorine into the liquid flowing in the pipe 1 at some point previous in the flow of the liquid to that part of the pipe shown, this arrangement being wholly conventional. Consequently, the flow of chlorine from the feed device 161 to the pipe 1 is reduced or increased, as may be necessary to restore the residual chlorine of the liquid to its desired value, whereupon the arm 157 resumes its "normal" position in which both contacts are open. It will be understood that if the control system tends to hunt, delay apparatus (not shown), e. g. similar to the cam 49 and contacts 50 previously described, may be associated in the circuit of valve 160.

Figure 2 illustrates a system embodying certain modifications or alternative devices, but also generally including a number of elements which are similar to those of Fig. 1, functioning in the same manner and bearing the same reference numbers, so that repeated description of them is unnecessary. In Fig. 2 a potentiometer recorder 55 has been shown in lieu of the galvanometer relay 37 of Fig. 1. Various types of suitable potentiometer recorders are now commercially available, an example being one known as the "Micromax" recorder which is manufactured by the Leeds & Northrup Company of Philadelphia, Pa. This recorder is of the so-called "null" type and draws no current from the cell 5 except momentarily when the potentiometer is adjusting itself to neutralize voltage changes which have taken place between the electrodes 7 and 24 of the cell 5. Furthermore, the potentiometer is equipped with "high"-"low" contacts 55a, 55b, which are arranged to be engaged or closed (in fashion generally similar to the contacts 41—40 of Fig. 1) whenever the indicator arm departs a given value from a predetermined control point—i. e., upon a predetermined small change in potential difference between the electrodes 7 and 24 of the cell 5.

In the system of Fig. 2 there is also shown a different form of apparatus for introducing chlorine to the dechlorinated liquid from the constant level box 16. Thus, in Fig. 2, there is diagrammatically illustrated a chlorine solution feeding device 56 which may be of any suitable kind, for instance of the general type described in my U. S. Patent No. 1,593,109, issued July 20, 1926. It may be explained that the device 56 is adapted to feed a chlorine solution of known concentration through the pipe 56a, and thus into the cell feeding chamber 21 for mixture with the de-chlorinated water. The rate of feed of the device is conveniently governed by the rate of drive of its mechanical operating parts.

For control intermediate the potentiometer recorder 55 and the solution feeding device 56 in Fig. 2, a variable speed box and motor drive unit 57 may be provided, including a suitable driving motor (not specifically shown) which has a drive pulley 58 to operate a belt 59 which thus rotates the drive pulley 60 of the feed device 56. As will be understood, the variable speed box 57 includes a continuously variable speed drive mechanism or other apparatus which may be adjusted, for example, by rotation of a control wheel 61. In the illustrated apparatus, the control element 61 is mechanically connected to each of a pair of opposed motors 62, which have their respective field coils 63 and 64 connected to the high-low contacts 55b, 55a of the potentiometer. The connection of the winding 63, 64, to and selectively through the contacts for energization by the A. C. line 65, is such that when the potentiometer arm is at its normal control position (representing no appreciable change in the potential difference across the cell 5) both the field windings are disconnected from the line 65, but when there is a departure from this control point one or the other of the field windings is energized, according to the direction of such departure, so as to cause rotation of the speed control wheel 61 in a direction for increasing or decreasing the rate of feed of chlorine solution by the device 56 to the chamber 21.

That is to say, if there is a departure from chemical balance of the liquids in the respective sides of the cell 5, a corresponding one of the potentiometer control contacts 55a, 55b will be engaged so as to increase or decrease the rate of chlorine solution feed in such way as to restore chemical balance. The chemical condition established by the feeding device is thus kept equivalent to the chemical condition (e. g. the chlorine concentration) of the liquid in pipe 1, and is readily measurable by the speed of rotation of the drive 58—60 for the feeding device. Accordingly, a tachometer 66 may be connected for operation by a shaft 67 extending to the pulley 58, and the tachometer scale or its readings or the readings of recording instrumentalities which may be operated from it, can be readily calibrated to indicate the chlorine concentration of the liquid in pipe 1.

It will now be readily understood that other devices than the tachometer may be employed to indicate or register the rate of operation of the feeding device and thus the chemical condition of the sampled liquid; for example, a pointer or recorder pen arm may be operated from the control wheel 61 of the variable speed box 57, in such way that the angular or other position assumed by such element will represent the chlorine concentration.

In many cases, certain elements of the recording potentiometer 55 may be omitted, for instance the chart drive, pen arm and chart; yet sometimes it may be desirable to keep such chart record, which will indicate any errors in the readings of the indicator 66 that might result from inability of the system to regain balance promptly after large fluctuations in the composition of the liquid in the pipe 1.

Various other types of adjustable feeding devices, such as calibrated and readable orifices, valves or the like, may also be employed for effecting addition of the substance under test, to the liquid which has been treated in the device 12. For example, in Fig. 3 there is shown yet another form of chlorine solution feeding device which may be utilized instead of the feeder 56 in Fig. 2 and which may be readily controlled by means, for instance, of an electrical system such as that of Fig. 1, embodying the galvanometer relay 37 and the servo-motor 42.

Referring to Fig. 3, a sealed chamber 68 contains chlorine solution of known concentration. An outlet tube 69, conveniently extending from the chamber 68 at a point near the bottom thereof, terminates in a downwardly directed orifice 70 which is designed or calibrated so that it will pass a predetermined amount of solution for any given head of liquid impressed upon it. A tube 71, having its upper end open to the atmosphere, extends down into the liquid in the chamber 68 and is arranged to be moved in a vertical direction, say by the rack 72 and the spur gear 73 operated by the motor 42. The adjustable assembly, including the rack 72, may carry a pointer 74 to traverse a scale 75.

As the lower end of the tube 71 is below the level of the liquid in the chamber, it will now be appreciated that the head or pressure on the liquid in feeding tube 69 will depend upon the vertical position of the tube 71, i. e., the distance of its lower end below the liquid level, the space above the liquid in the chamber being sealed from the outer atmosphere. Accordingly, the orifice 70 may be arranged to feed chlorine solution into the feed chamber 21 of the cell 5 (see Figs. 1 and 2, the sample feed pipe 18 being connected to the constant level box 16 in the manner of Fig. 2); and the readings of the pointer 74 on scale 75 may thus be correlated to indicate the rate of chlorine addition through the orifice 70, inasmuch as such rate of addition varies with the vertical position of the assembly 71, 72, 74. If desired, a supplementary solution supply and constant level device (not shown) may be provided for the chamber 68, to prevent errors on the scale 75 due to changes of level in the chamber.

Thus, if the apparatus in Fig. 3 is substituted for the chlorine cell 26, galvanometer recorder 35 and associated control circuit of Fig. 1, the remaining apparatus will be operated in substantially the same way, and upon a difference in chlorine concentrations of the liquids in the two sides of the cell 5, the resulting potential difference will cause operation of the motor 42 and consequent adjustment of the chlorine solution feed in such fashion as to restore chemical balance.

Somewhat modified forms of liquid feeding devices are shown in Figs. 4 and 5; these again being adapted to handle, for example, a chlorine solution of known concentration, as in the case of Fig. 3. In Fig. 4, the solution is contained in an inverted flask or chamber 76. A U-tube 77 has one leg 77a extending up into the chamber with its upper end opening above the liquid, the portion 77a also having a small opening 77b into the liquid near the lower part of the flask. The other leg 77c of the U-tube is open to the atmosphere and conveniently has a lower extension, such as shown, for stabilizing the feed of solution and to provide an outlet for such feed as hereinafter explained. It will now be understood that the solution is maintained at a substantially constant level in the leg 77c of the U-tube, regardless of the actual level of the liquid in the flask 76. That is to say, as the liquid tends to rise above such predetermined level in the leg 77c, the reduced pressure above the liquid in the flask tends to prevent such rise; while upon withdrawal of liquid from the leg 77c, air may be sucked back in through the U-tube so as to permit rise of the liquid in the leg 77c to the predetermined level from which it may have dropped.

For feed of solution from the apparatus to the sampling system, e. g., to the feed chamber 21 (see Figs. 1, 2 and 3), there is provided a capillary tube 79 having a known bore and extending from the bottom of the U-tube leg 77c, through a flexible portion 80 to discharge into the chamber 21. Accordingly, the chlorine solution will be drawn through the capillary tube 79—80, at a rate dependent upon the distance of the lower or discharge end of the tube below the assembly comprising the flask 76 and the U-tube 77. Inasmuch as the flow through the capillary tube may depend to a certain extent on the temperature of the liquid, the lower portion of the U-tube 77, and its leg 77c, are conveniently enclosed in a chamber 78, through which cooling liquid may pass, to maintain a constant temperature for the supplied solution.

Relative adjustment is provided between the lower end of the tube 79—80 and the assembly constituting the flask 76 and U-tube 77, so as to adjust the rate of solution feed. Thus the last-mentioned assembly may be vertically displaced by a rack 172 and pinion 173, the pinion being driven by suitable apparatus, such as the servomotor 42 (not shown in this figure) as illustrated and described in connection with Figs. 1 and 3. The vertical position of the assembly will correspond to the rate of feed of chlorine solution and may be calibrated accordingly; and it will be understood that this simple form of apparatus is sometimes preferred, inasmuch as the calibration of the vertical position in terms of chlorine feed is substantially unaffected by the quantity of solution in the supply chamber and there is no need for a constant level device in the chamber.

Fig. 5 illustrates a modification of the apparatus in Fig. 4, wherein a calibrated orifice is substituted for the calibrated capillary tube. In Fig. 5, where the apparatus may be otherwise the same as in Fig. 4, and include the flask 76, U-tube 77 and associated adjusting apparatus, the withdrawal of liquid from the open leg 77c is achieved through a calibrated orifice 82 in the bottom of the leg 77c, opening into a tube 79a which may discharge into the chamber 21 by a flexible connection (not shown) disposed similarly to the tube 80 of Fig. 4. The adjustment of solution feed is made in the same manner as in Fig. 4, and the rate of such feed for any given vertical position of the movable assembly is determined by the size of the orifice 82.

Although the invention may be applied to control purposes instead of or in addition to direct measurement (for example, by operating contacts or other devices from the recorder of Fig. 1 as disclosed above, or from the tachometer 66 of Fig. 2, to control a chlorinator for pipe 1; or even by operating the chlorine feed to the sample line at a constant desired rate and causing chemical unbalance to adjust the main chlorinator to restore balance), the systems are of notable utility for the measurement or recording of the chemical condition of the material tested. For example, such registration of chlorine content is not only desirable for the usual purposes of control, interpretation, future economy and the like, but is of special importance in public health installations, as in chlorinating public water supplies and sewage systems, where health considerations demand the highest care and a scrupulously kept record of operations. It will now be seen that the invention is particularly advantageous, in that effects due to other conditions of the liquid than chlorine concentration are balanced out, and likewise such non-uniformity or other sources of inaccuracy as may occur in the cells or the like used for testing. Moreover, in testing chlorinated liquids, it is often desirable to sample at some distance from the point of chlorination, i. e. at a point where the then residual content of chlorine affords the best indication that the introduced chlorine has been and is serving its intended purpose. Thus the present invention, which requires sampling at only that one point and no sampling of the unchlorinated liquid, avoids the inconvenience and other difficulties of one or more long sampling lines which would be needed for a comparison of samples taken from remotely separated places.

It will now be appreciated that procedure of the character described is applicable to other operations than the detection of chlorine, such for instance as in the measurement of acidity or alkalinity or other condition in a flowing material, which is susceptible of neutralization (or elimination), measured re-establishment, and subsequent detection.

In accordance with the provisions of the patent statutes, I have herein described the principle of operation of my invention, together with the apparatus which are now considered to represent the best embodiments thereof, but I desire to have it understood that the apparatus disclosed is only illustrative and that the invention can be carried out by other means. Also, while it is designed to use the various features and elements in the combinations and relations described, some of these may be altered and others omitted and some of the features of each modification may be embodied in the others without interfering with the more general results outlined, and the invention extends to such use within the scope of the appended claims.

I claim:

1. In a method of detecting changes in the content of a given chemical constituent in a fluid, the steps comprising continuously subjecting a portion of the fluid flowing as a stream at constant velocity to treatment for removal of said constituent therefrom, thereafter continuously treating said portion to add said constituent thereto to establish a known concentration of said constituent therein, then continuously comparing said treated portion of fluid with a similar stream of the untreated fluid to determine the relative concentrations of said chemical constituent in said streams, and detecting differences in the concentrations of said constituent of the compared streams.

2. The method of maintaining a predetermined content of a substance in a fluid, which comprises continuously subjecting a portion of the fluid flowing as a stream at constant velocity to treatment for removal of the substance as such therefrom, continuously adding a fresh quantity of the substance to the said treated portion at an adjustable rate, continuously comparing said treated portion with an untreated portion of the original fluid to detect any actual difference in their respective contents of the substance, varying said rate until said actual differences become zero, and controlling the concentration of said substance initially in said liquid to bring the concentration thereof determined as aforesaid to a predetermined value according as the adjusted rate of addition of said substance aforesaid differs from said predetermined value.

3. The method of claim 2, for detecting changes in the concentration of a substance which is adapted to produce a detectable electrical effect at an electrode exposed to the fluid containing said substance, wherein the comparing step is effected by exposing the first mentioned fluid portion, after the fresh quantity of said substance has been added thereto, to an electrode, exposing said untreated portion to another electrode, and detecting the difference in electrical effects respectively produced on said electrodes as representative of differences in the concentrations of said substance in the portions thus compared.

4. The method of determining the chlorine content of a liquid, which comprises continuously dechlorinating a portion of the liquid flowing as a continuous stream at a constant velocity, adding chlorine to said portion at a determinable adjustable rate, continuously comparing said portion with an untreated portion of the liquid and detecting the difference in their concentrations of chlorine, adjusting the rate of addition of chlorine to the first portion in correspondence with the detected difference to produce equivalence of chlorine content of the compared portions and thus to reduce such difference to zero, and determining the adjusted rate of chlorine addition as directly indicative of the chlorine content of the liquid.

5. The method of detecting the chlorine content of a liquid, which comprises continuously subjecting a portion of the liquid flowing as a continuous stream at a constant velocity to dechlorination treatment, continuously adding chlorine to said dechlorinated portion at a variable rate, continuously detecting and converting difference between the chlorine content of said dechlorinated and rechlorinated portion and that of an untreated portion of the liquid into a difference of electrical potential, adjustably varying the rate of addition of chlorine added to said dechlorinated portion so as to reduce said potential difference to zero, and detecting the adjusted rate of addition of chlorine necessary to reduce the potential difference to zero as indicative of the chlorine content of the liquid which is to be detected.

6. In a method of detecting changes in the chlorine concentration of a liquid, the steps comprising dechlorinating a portion of the liquid flowing continuously as a stream at constant velocity, continuously adding chlorine to said portion at a known rate, taking a second continuously flowing stream of the liquid of the same chlorine content as the main body of the said liquid, and continuously comparing by measurement the relative chlorine contents of the two said streams.

7. In apparatus for detecting changes in the concentrations of a given constituent in a body of liquid, in combination, electrochemical cell apparatus so constructed as to contain and compare the concentrations of said constituent in two continuously flowing sample streams from said body, a first conduit means for one of said streams, connected to said cell apparatus, said conduit means including a chamber constructed to contain means for removing said constituent as such and to contact such stream with said means, and a constant flow regulating means, a second conduit means for the other of said streams connected to said cell apparatus and by-passing the above stated elements included in said first conduit means, means for supplying said constituent connected to said first conduit means intermediate said chamber and said cell apparatus, and means connected to said cell apparatus and said means for supplying said constituent responsive to changes in the relative concentrations of said constituent in said two streams in said cell apparatus and arranged to regulate said supply means in accordance with such changes so as to change the rate of supply of said constituent by said supply means to produce a zero difference between the concentrations of said constituent in said two streams, whereby the adjusted rate of supply of said constituent by said supply means is directly indicative of the concentration of said constituent in said body of liquid.

8. Apparatus for detecting changes in the concentration of available chlorine in a body of an aqueous liquid, in combination, electrochemical cell apparatus so constructed as to contain and compare the concentrations of available chlorine in two continuously flowing sample streams from said body, a first conduit means for one of said streams, connected to said cell apparatus, said conduit means including a chamber constructed to contain means for removing available chlorine as such and to contact said first stream with said means, and a constant flow regulating means, a second conduit means for the other of said streams connected to said cell apparatus and by-passing the above stated elements included in said first conduit means, means for supplying available chlorine to the stream flowing through said first conduit means and connected thereto intermediate said chamber and said cell apparatus, the last named means including electrolytic chlorine-generating means constructed and arranged to supply chlorine at a variable rate directly depending upon the current passing therethrough, and means connecting said cell apparatus and said means for supplying chlorine responsive to changes in the relative concentrations of available chlorine in the two streams in said cell apparatus and arranged to regulate the rate at which current passes through said electrolytic means to supply chlorine to said first stream in accordance with such changes.

9. In apparatus for detecting changes in the concentration of a given constituent in a body of liquid, in combination, electrochemical cell apparatus so constructed as to contain and compare the concentrations of said constituent in two continuously flowing sample streams from said body, said electrochemical cell apparatus comprising a cell having two compartments separated by a porous diaphragm and having an electrode in each of said compartments arranged for contact with liquid therein, a first conduit means for one of said streams connected to one of said compartments of said electrochemical cell apparatus, said conduit means including a chamber constructed to contain means for removing said constituent as such and to contact said stream with said means, and a constant flow regulating means, a second conduit means for the other of said streams connected to the other compartment of said electrochemical cell apparatus and by-passing the above stated elements included in said first conduit means, means for supplying said constituent connected to said first conduit means intermediate said chamber and said electrochemical cell apparatus and electrical means connecting said electrodes of said electrochemical cell apparatus and the means for supplying said constituent responsive to changes in the potential between said electrodes and in turn responsive to the changes of the relative concentrations of said constituent in said two streams and arranged to regulate said supply means in accordance with such changes.

10. In apparatus for detecting changes in the concentration of a given constituent in a body of liquid, in combination, analytical apparatus so constructed as to contain and compare the concentrations of said constituent in two continuously flowing sample streams from said body, a first conduit means for one of said streams, connected to said analytical apparatus, said conduit means including a chamber constructed to contain means for removing said constituent as such and to contact said stream with said means, and a constant flow regulating means, a second conduit means for the other of said streams connected to said analytical apparatus and by-passing the above stated elements included in said first conduit means, means for supplying said constituent connected to said first conduit means intermediate said chamber and said analytical apparatus, and means connecting said analytical apparatus and said means for supplying said constituent responsive to changes in the relative concentrations of said constituent in the two streams in the analytical apparatus and arranged to regulate said supply means in accordance with such changes.

11. In apparatus for detecting changes in the concentration of a given constituent in a body of liquid, in combination, electrochemical cell apparatus so constructed as to contain and compare the concentrations of said constituent in two continuously flowing sample streams from said body, a first conduit means for one of said streams, connected to said cell apparatus, said conduit means including a chamber constructed to contain means for removing said constituent as such and to contact said stream with said means, and a constant flow regulating means, a second conduit means for the other of said streams connected to said cell apparatus and by-passing the above stated elements included in said first conduit means, means for supplying said constituent, connected to said first conduit means intermediate said chamber and said cell apparatus, and means connecting said cell apparatus and said means for supplying said constituent responsive to changes in the relative concentrations of said constituent in the two streams in the cell apparatus and arranged to regulate said supply means in accordance with such changes.

12. In apparatus for detecting changes in the concentration of a given constituent in a body of liquid, in combination, analytical apparatus so constructed as to contain and compare the concentrations of said constituent in two continuously flowing sample streams from said body, a first conduit means for one of said streams, connected to said analytical apparatus, said conduit means including a chamber constructed to contain means for removing said constituent as such and to contact said stream with said means, a mixing chamber, and a constant flow regulating means, a second conduit means for the other of said streams connected to said analytical apparatus and including constant flow regulating means and by-passing the above stated elements included in said first conduit means, means for supplying said constituent connected to said mixing chamber, and means connecting said analytical apparatus and said means for supplying said constituent responsive to changes in the relative concentrations of the constituent in the two streams in said analytical apparatus and arranged to regulate said supply means in accordance with such changes.

13. In apparatus for detecting changes in the concentration of a given constituent in a body of liquid, in combination, electrochemical cell apparatus so constructed as to contain and compare the concentrations of said constituent in two continuously flowing sample streams from said body, a first conduit means for one of said streams, connected to said cell apparatus, said conduit means including a chamber constructed to contain means for removing said constituent as such and to contact said stream with said means, a mixing chamber, and a constant flow regulating means, a second conduit means for the other of said streams connected to said cell apparatus and including constant flow regulating means and by-passing the above stated elements included in said first conduit means, means for supplying said constituent connected to said mixing chamber, and means connecting said cell apparatus and said means for supplying said constituent responsive to changes in the relative concentration of the constituent in the two streams in the cell apparatus and arranged to regulate said supply means in accordance with such changes.

14. Apparatus for detecting changes in the concentration of a given constituent in a body of liquid, in combination, electrochemical cell apparatus so constructed as to contain and compare the concentrations of said constituent in two continuously flowing sample streams from said body, a first conduit means for one of said streams, connected to said cell apparatus, said conduit means including a chamber constructed to contain means for removing said constituent as such and to contact said stream with said means, and a constant flow regulating means, a second conduit means for the other of said streams connected to said cell apparatus and by-passing the above stated elements included in said first conduit means, a container for a solution of said constituent in a liquid which is the same as the first named liquid, means for supplying said solution from said container at a variable rate and connected to said first conduit means intermediate said chamber and said cell apparatus, and means connecting said cell apparatus and said means for supplying said constituent responsive to changes in the relative concentrations of said constituent in the two streams in said cell apparatus and arranged to regulate the rate of supply of said solution in accordance with such changes.

15. In a method of controlling the content of a given chemical constituent in a main body of material, continuously treating a portion of said material flowing as a stream at a constant velocity to remove said constituent, thereafter continuously subjecting said portion to treatment of variable and determinable extent for reestablishment of a content of the constituent which is equivalent to that of the main body of material, continuously comparing by measurement the content of said constituent of said portion with that of an untreated portion of the main body of material, and upon changes in the content of the constituent in said untreated portion, varying the re-establishment treatment to maintain equivalence of said portions with respect to said chemical constituent, subjecting the main body of material to a treatment adapted to modify its content of said constituent, and converting departure of the re-establishment treatment from a predetermined value thereof into variation of the treatment of the main body to maintain its content of the constituent at a predetermined value.

16. In a method of detecting the content of a given chemical constituent in a material, continuously treating a portion of said material flowing as a continuous stream at a constant velocity to remove said constituent, continuously subjecting said portion to treatment at a variable rate for reintroducing said chemical constituent, to establish equivalence of content of the constituent in said treated portion and in the untreated material, correlating said rate with the content of the constituent in the untreated material so that both the first named portion and said untreated material have the same concentration of said constituent, and translating departure of said rate of treatment from a predetermined value into an indication of departure of the content of the chemical constituent in the untreated material from a predetermined value.

17. In apparatus for controlling the concentration of a given constituent in a body of a liquid flowing through a main, in combination, electrochemical cell apparatus so constructed as to contain and compare the concentrations of said constituent in two continuously flowing sample streams from said body, a first conduit means for one of said streams, connected to said cell apparatus, said conduit means including a chamber constructed to contain means for removing said constituent as such and to contact said stream with said means, and a constant flow regulating means, a second conduit means for the other of said streams connected to said cell apparatus and by-passing the above stated elements in said first conduit means, means for supplying said constituent connected to said first conduit means intermediate said chamber and said cell apparatus, means connecting said cell apparatus and said means for supplying said constituent responsive to changes in the relative concentrations of said constituent in the two streams in said cell apparatus and arranged to regulate said supply means in a direction such as to bring the concentrations of said constituent in said two streams into exact equality, and means responsive to the adjusted rate of supply of said constituent by said supply means for regulating the amount of said constituent in the liquid in said main.

18. In apparatus for maintaining the concentration of available chlorine in a body of an aqueous liquid flowing in a main, in combination, electrochemical cell apparatus so constructed as to contain and compare two continuously flowing sample streams from said body, said cell apparatus comprising a two-compartment potential cell wherein said compartments are divided by a porous diaphragm and wherein there is an electrode in each of said compartments, a first conduit means for one of said streams, connected to one compartment of said cell apparatus, said conduit means including a chamber constructed to contain means for removing the available chlorine as such and to contact said stream with said means, and a constant flow regulating means, a second conduit means for the other of said streams connected to the other compartment of said cell apparatus and by-passing the above stated elements included in said first conduit means, an electrolytic cell for supplying chlorine at a variable rate in proportion to the amount of current passing therethrough and connectd to supply chlorine to the stream in said first conduit means intermediate said chamber and said cell apparatus, electrical circuit means including the electrodes of said cell apparatus and connected to control the amount of current passing through said electrolytic cell to bring the concentrations of available chlorine in said two streams in said cell apparatus to exact equality, means responsive to the amount of current supplied to said electrolytic cell for controlling the amount of chlorine supplied to the liquid flowing through said main, and means for indicating the adjusted amount of current passing through said electrolytic cell for thereby indicating the concentration of available chlorine passing through that portion of the main from which said first stream is drawn.

19. The method of determining the concentration of a chemical in a body of liquid which comprises flowing two sample streams from said liquid body, removing from one stream said chemical, adding to said one stream subsequent to removal of the chemical more of the chemical, in known quantity, determining the difference in concentrations of the chemical in the two streams after the addition of the chemical to the one stream and varying the rate of addition of the chemical to the said one stream until said difference disappears, said rate of addition required to maintain the concentration of the chemical in the two streams the same being a measure of the concentration of the chemical in said body of liquid.

CHARLES F. WALLACE.